(12) United States Patent
Papa et al.

(10) Patent No.: US 11,889,591 B2
(45) Date of Patent: Jan. 30, 2024

(54) INTEGRATED BASE STATION AND SECURITY SYSTEM

(71) Applicant: Parallel Wireless, Inc., Nashua, NH (US)

(72) Inventors: Steven Paul Papa, Windham, NH (US); Rajesh Kumar Mishra, Westford, MA (US); Kaitki Agarwal, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/001,677

(22) Filed: Aug. 24, 2020

(65) Prior Publication Data

US 2021/0059012 A1 Feb. 25, 2021

Related U.S. Application Data

(60) Provisional application No. 62/890,683, filed on Aug. 23, 2019.

(51) Int. Cl.
*H04W 84/04* (2009.01)
*H04W 8/04* (2009.01)
*H04W 36/04* (2009.01)
*H04W 24/02* (2009.01)

(52) U.S. Cl.
CPC .......... *H04W 84/045* (2013.01); *H04W 8/04* (2013.01); *H04W 24/02* (2013.01); *H04W 36/04* (2013.01)

(58) Field of Classification Search
CPC ....... H04W 36/04; H04W 24/02; H04W 8/04; H04W 84/045
See application file for complete search history.

(56) References Cited

U.S. PATENT DOCUMENTS

| | | | |
|---|---|---|---|
| 2011/0307932 A1* | 12/2011 | Fan | H04N 21/8126 725/110 |
| 2012/0122424 A1* | 5/2012 | Herscovici | H04W 24/02 455/411 |
| 2012/0314692 A1* | 12/2012 | Tinnakornsrisuphap | H04W 92/045 370/338 |
| 2015/0092672 A1* | 4/2015 | Das | H04W 48/16 370/329 |
| 2015/0237457 A1* | 8/2015 | Yu | H04W 4/60 455/558 |
| 2018/0041311 A1* | 2/2018 | Werner | H04L 1/1858 |
| 2018/0242377 A1* | 8/2018 | Basrur | H04W 76/10 |
| 2019/0053180 A1* | 2/2019 | Lalam | H04W 72/20 |
| 2021/0227405 A1* | 7/2021 | Mishra | H04W 24/02 |
| 2022/0110001 A1* | 4/2022 | Ginis | H04W 24/02 |

OTHER PUBLICATIONS

Cellbounce—Smart 3G to 4G Conversion, https://cellbounce.com/, Aug. 2, 2019.

* cited by examiner

*Primary Examiner* — Dai Phuong
(74) *Attorney, Agent, or Firm* — Michael Y. Saji; David W. Rouille

(57) ABSTRACT

A system is presented for providing cellular backhaul for a home security system. In one embodiment the system includes a home security system including a microcontroller; and a 2G femto base station in communication with the home security system; wherein the home security system uses the 2G femto base station for communications external to the home security system.

11 Claims, 5 Drawing Sheets

INTEGRATED BASE STATION AND SECURITY SYSTEM

CROSS-REFERENCE TO RELATED APPLICATIONS

This application claims priority under 35 U.S.C. § 119(e) to U.S. Provisional Pat. App. No. 62/890,683, filed Aug. 23, 2020, titled "Integrated Base Station and Security System" which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

ATT and Verizon have announced the sunsetting of the 3G networks to make way for 4G, leaving 220 million 3G devices unable to connect, communicate or transact. Affected devices include security systems, power meters, ATM's, vending services, auto services like OnStar, HVAC and traffic control. Over a decade was spent installing these 3G modules in the field and now the industry has been given less than three years to replace them all, nearly an impossible situation.

Traditional upgrade solutions would require that trained technicians manually upgrade each and every 3G device, such as security systems, power meters, ATMs, vending machines, HVAC, and traffic controls, to name a few.

SUMMARY

In one example embodiment, a system is disclosed. The system includes a home security system integrated with, and in communication with, a 2G base station. The home security system uses the 2G base station for communications external to the home security system.

In another embodiment, an automotive assistance device is disclosed. The automotive assistance device includes a 2G base station disposed within a vehicle; wherein the 2G base station is used to provide assistance to drivers; and wherein the 2G base station uses wireless backhaul.

DETAILED DESCRIPTION

Machine-to-Machine (M2M) devices are dropping off the network fast, and the service providers are scrambling for solutions. The rest of the world is lagging behind the USA by between 12 to 48 Months. One billion M2M Internet of things (IoT) devices from the security, telematics, smart meter, industrial IoT & other M2M IoT segments will be shut down.

One home security company says that more than half of its 7.2 million security panels use 3G cellular service today, mostly from AT&T, which sunsets the service in February 2022. This will kill cellular service for millions of security panels that use cellular for their main alarm communications or for back-up if IP or POTS (plain old telephone service) fails. Replacing the 3G service could be very costly. For example, if it costs the home security company $200 in parts and labor to replace each radio (or panel), multiply that by a conservative 3.7 million customers, and the bill could total some $740 million.

Figure 1:
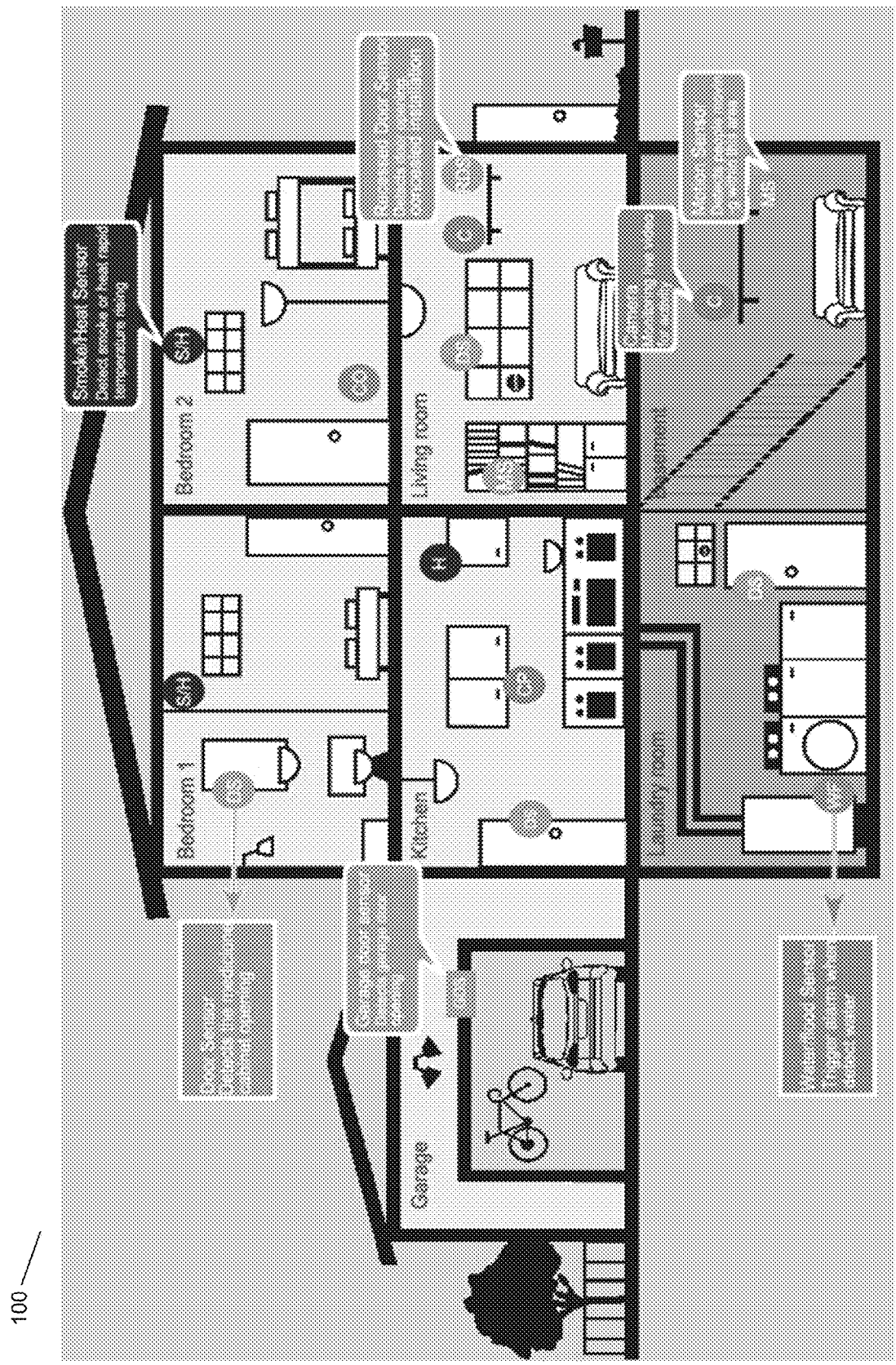
FIG. 1 is a diagram of a security system, in accordance with some embodiments.

An example home security system 100 is shown in FIG. 1. In some embodiments, a home security system can include various combinations of sensors and cameras, disposed throughout a residence. The home security system includes a garage door sensor for monitoring the open or closed status of the garage door. The basement includes a water/flood sensor which triggers an alarm when water is detected. The basement further includes a living are which includes a motion sensor for detecting people moving within the basement area and also a camera for monitoring activity. The kitchen includes a door sensor, a heat sensor and a camera. The living room includes door and window sensors and a camera. The bathroom includes a door sensor for the medicine cabinet. The bedroom includes a smoke and heat sensor. A second bedroom includes a smoke/heat sensor and a carbon monoxide sensor. The home's security system also includes a central panel and a 2G base station (not shown).

Figure 2:
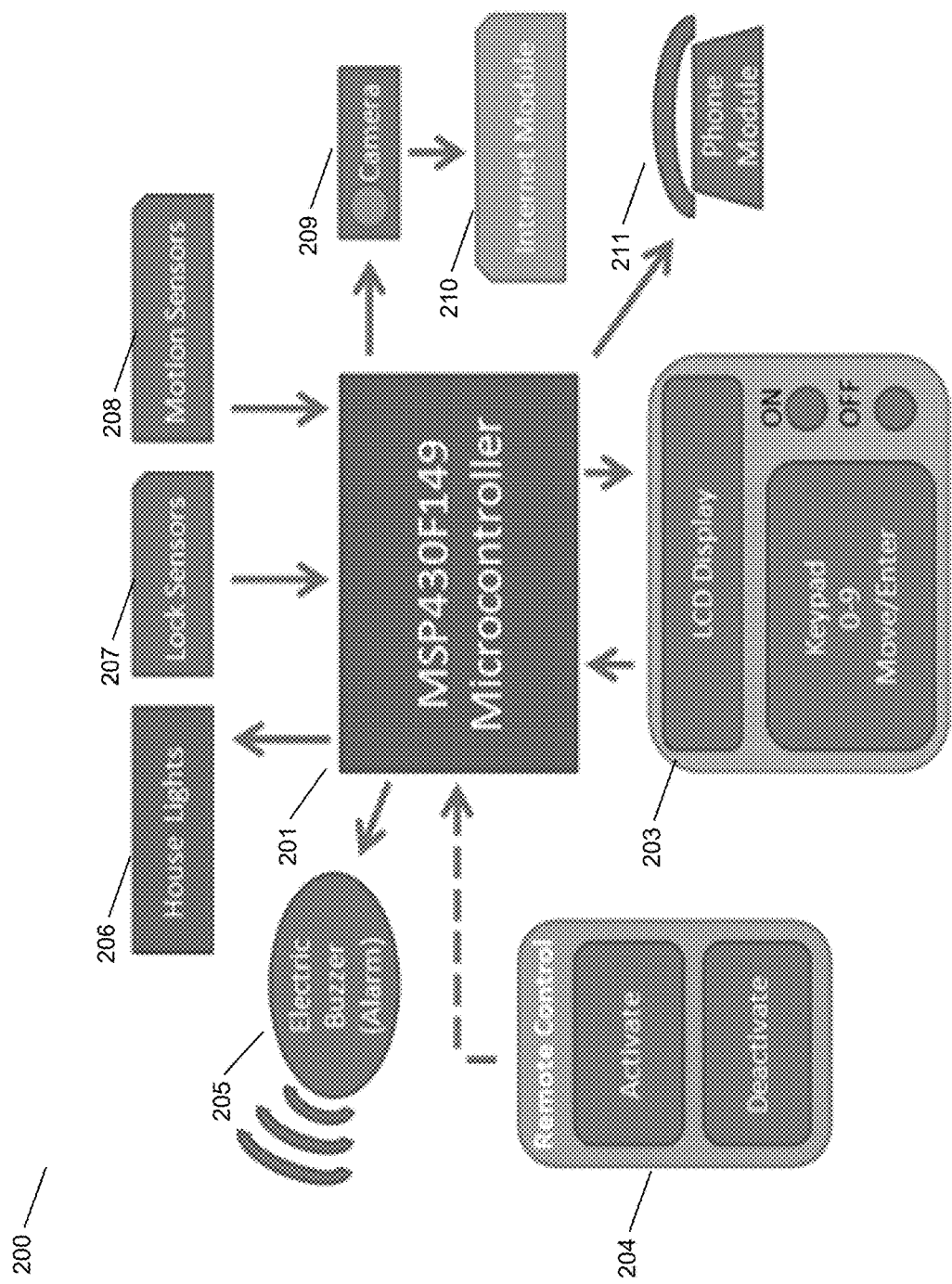
FIG. 2 is a block diagram of a security system, in accordance with some embodiments.

FIG. 2 shows a block diagram of the core 200 of the home security system. The system block diagram shows the major components of the home security system. The system is composed by the following components: a microcontroller 201, the house lights 206, motion sensors 208, lock sensors 207, a remote control 204, a manual keypad 203, an alarm speaker 205, the internet module 210, a phone 211, a camera 209 and a 2G base station 202. It also shows the general overview of all the hardware components and their interaction between one another.

The Remote Control 204 is used by the user to turn on and off the alarm remotely. The User Interface 203 is used to arm and disarm the system and control all the general functionality of the alarm. The Keypad is used for setting up and arming or disarming the system. The LCD Screen displays all the information regarding the alarm and other settings so that the user can see them. The LED On and Off Lights relay current status of the alarm readiness. The Phone Module 211 allows the interfacing of a phone for communication purposes between the system and the user's cell phone or emergency services. It will relay any activation of the alarm to the owner. The Phone Module 211 connects to the 2G femtocell described elsewhere herein. The Internet Module 210 allows for the creation of an internet page to be accessed by the owner to see the status of the system with a log of anything that has happened. The House Lights 206 are a visual notification as well as possible deterrent for would be attackers. The Buzzer 205 is used to notify that someone is entering a restricted area. The Lock Sensors 207 monitor if doors or windows have been opened. The Motion Sensors 208 will detect any intrusion into the perimeter of coverage of the alarm. The 2G base station 202 is used for communications external to the home being monitored by the home security system.

In some embodiments, a 2G (instead of 3G) base station can be incorporated. In some embodiments, this may be done using a femtocell silicon device, i.e., a femtocell implemented in a dedicated silicon chip. Such a 2G femtocell silicon device is novel as of the date of the present filing. In some embodiments the 2G base station module is used to supplement a Wi-Fi, IP, 3G, or 4G module. In some embodiments the 2G module provides primary (non-supplementary) communications functionality. In some embodiments the 2G base station is used to provide wireless access to an existing security system with a 2G modem. In some embodiments the 2G base station is electrically coupled to a security system; in other embodiments the 2G base station is communicatively coupled to the security system. The 2G base station can authenticate the 2G SIM of the home security system (using a connected core network, which may be a 2G core network).

In some embodiments a silicon ASIC is used to provide a 2G (or 3G or 4G or 5G or other) base station functionality, which may be a femtocell. In some embodiments a custom ASIC is used to solve this problem end to end and integrate it into a single chip. In other embodiments, multiple chips are used, for example, a general-purpose processor (GPP) plus a baseband processor plus a radio chip. In some embodiments, an ARM device, Raspberry Pi device or other low-power, low-cost, low-processing power chip is used for a general-purpose processor for running a 2G BTS, coupled to a 4G UE modem for backhaul radio. In some embodiments, Wi-Fi or Ethernet is used for backhaul and coupled to the 2G BTS or base station system (Raspberry Pi may have both of these functionalities built in). In some embodiments, an onboard Ethernet chip or USB may be used internally to couple the components together. In some embodiments, a general purpose software-defined radio (SDR) chip may be used, which may use an FPGA, coupled to the GPP and backhaul, such as a Lime Micro SDR, or, an FPGA may be loaded with SDR instructions to provide a radio transceiver chain sufficient for 2G or the desired G. In some embodiments, a radio chip, such as an SDR chip, is sufficient to offer all the RX/TX radio transceiver chain, filtering and power/range required for this application. In some embodiments, integrating LoRa (Long Range, a low power long range CSS technology) or other chirp spread spectrum (CSS) technology into the customer silicon (provides a backup to cellular) is also contemplated. In some embodiments, a power management chip and 24-hour battery backup is also provided. In some embodiments, a single package may be used to reduce the size and power consumption of the system.

The system design is generally simplified in some embodiments, by the fact that, for purposes of a security system, only a single user (UE) is required to be supported by the base station, namely, the security system. For example, one way in which system design can be simplified is that only GPRS and voice is required to be supported. Another way in which system design can be simplified is that authentication of the UE to connect to the system can be simplified, for example, using a modified HSS, VLR, or other authentication server located on-device, and further, that may be configured to authorize any UE, not necessarily using standard 2G authentication schemes. For example, the SIM IMEI can be examined and all SIMs from a particular manufacturer may be permitted to attach. Other standard and nonstandard authentication schemes may be used as well, in some embodiments. 4G backhaul authentication can be handled by the 4G modem, in some embodiments.

More than one RAT is understood to be possible, so that 2G functionality could be provided for use with certain applications, such as home security systems, while other RATs are used for providing functionality using other Gs. For example, a combined femtocell could be marketed and sold for providing Wi-Fi or 3G connectivity to devices in the home, but may also provide 2G functionality for home security systems.

The 2G or other-G base station could be used for communications to and from the central security system monitoring service, in some embodiments. Wireless access using 2G or another RAT could be provided to other devices within the home (or immediate surrounding area) at low power. Backhaul could be provided using wireless backhaul via 2G or 4G or another RAT. Scheduling of cellular resources could be managed in conjunction with a cloud coordination server.

In an alternate embodiment, a base 2G or other-G base station could be used in an automotive assistance device, such as ONSTAR. ONSTAR is a service provided by General Motors Corporation that provides assistance to drivers in situations where, for example, they have been in an accident. ONSTAR typically also uses 3G modems and is subject to many of the same issues as described above for security systems. A small 3G base station (3G femtocell) configured to operate as an in-vehicle base station is contemplated that would allow the 3G modems that are currently in these driver assistance systems to connect and to use the small base station as backhaul. This has the advantage that other user devices could be used with the 3G femtocell as well. The 3G femtocell could use wireless backhaul, such as LTE backhaul. Alternately a 2G femtocell or other-G femtocell could be used. Multiple RATs could be supported; for example, a 4G femtocell could be equipped with one carrier of 2G or one carrier of 3G femtocell capacity, and the 2G or 3G femtocell could use the 4G connection to the core network as backhaul, in some embodiments; these RAT and backhaul combinations are contemplated to be used with any of the embodiments described herein.

Continuing on, the in-vehicle base station could provide LTE access (allowing LTE UEs to connect), LTE backhaul (using a built-in LTE UE to connect to an existing operator LTE network, and using the LTE UE's connection as the backhaul for the base station itself), and Wi-Fi backhaul meshing with other base stations nearby for sharing backhaul bandwidth and performing backhaul routing. Further details of the in-vehicle base station are provided in U.S. Pat. No. 8,867,418, hereby incorporated by reference, and the other documents incorporated above. The in-vehicle base station could be configured to reserve a portion of its access bandwidth (e.g., 1 TRX) for 2G or 3G, to enable a current or legacy generation 2G or 3G device such as ONSTAR.

Figure 3:
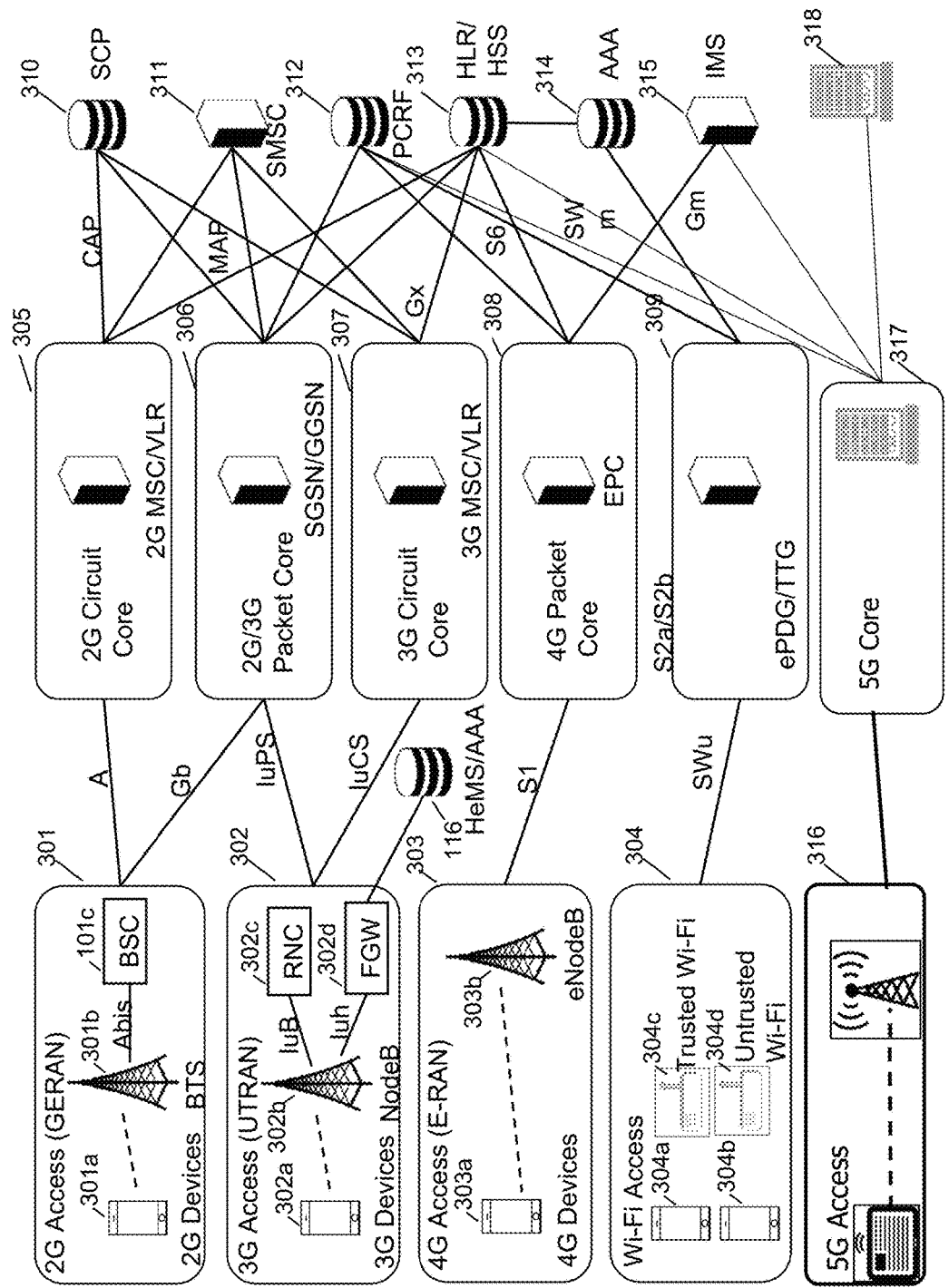
FIG. 3 is a is a schematic network architecture diagram for various radio access technology core networks.

FIG. 3 shows a schematic network architecture diagram for 2G and other-G prior art networks. The diagram shows a plurality of "Gs," including 2G, 3G, 4G, 5G and Wi-Fi. 2G is represented by GERAN 301, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
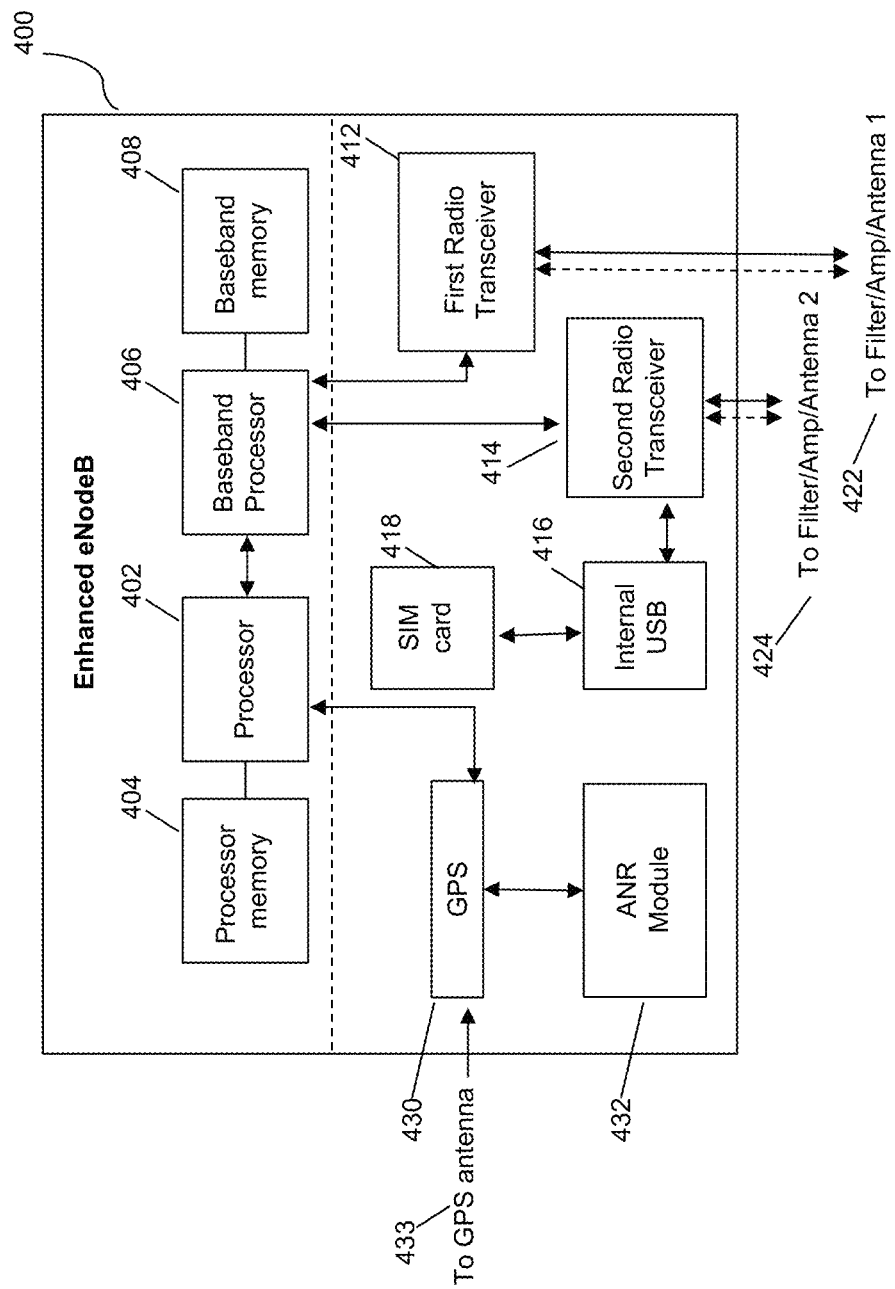
FIG. 4 is an enhanced eNodeB for performing the methods described herein, in accordance with some embodiments.

Shown in FIG. 4 is an enhanced eNodeB for performing the methods described herein, in accordance with some embodiments. eNodeB 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
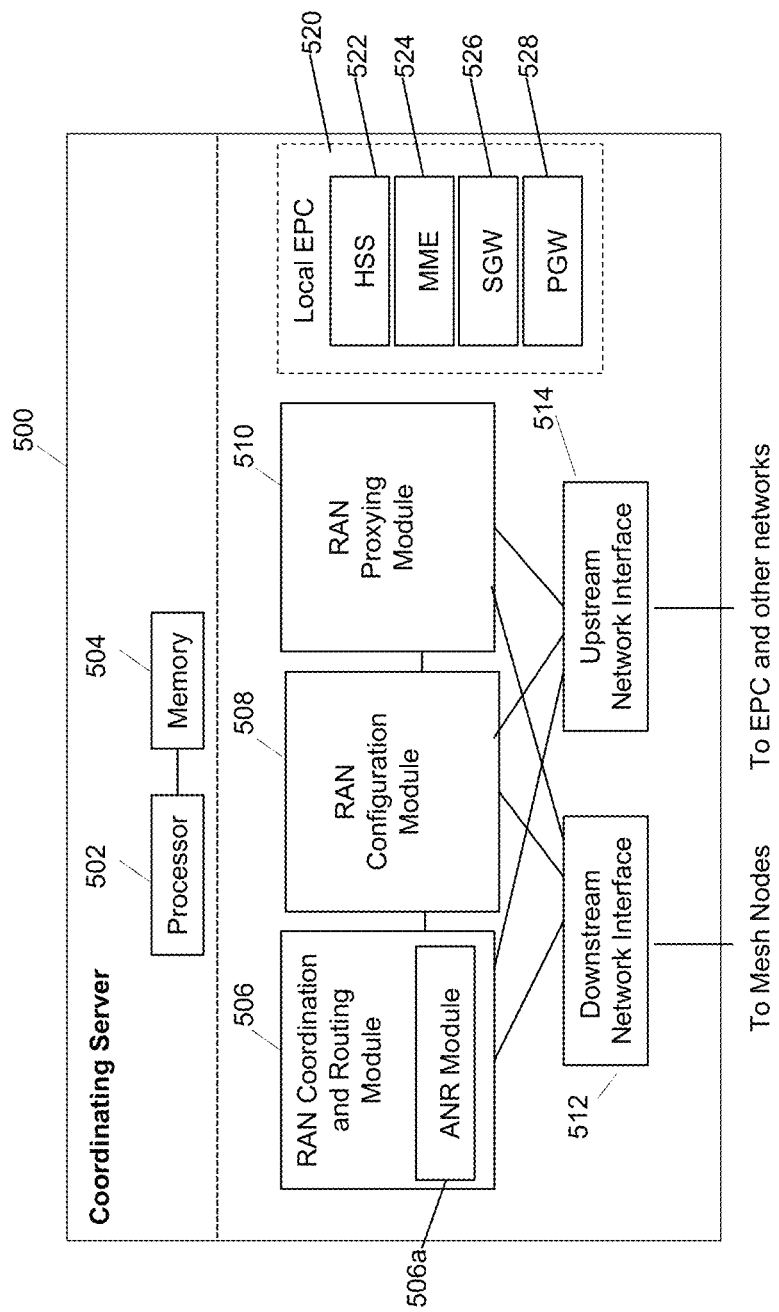
FIG. 5 is a coordinating server for providing services and performing methods as described herein, in accordance with some embodiments.

Shown in FIG. 5 is a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A system, comprising:
   a home security system including a second generation (2G) user equipment (UE); and
   a 2G femto base station in communication with the home security system, the 2G femto base station further comprising a fourth generation (4G) wireless backhaul for the 2G femto base station;
   wherein the home security system uses the 2G femto base station for communications external to the home security system.

2. The system of claim 1, further comprising a user interface in communication with the home security system, the user interface further comprising a keypad, a display and an on/off indicator.

3. The system of claim 1, wherein the 2G femto base station further comprises a software-defined radio providing 2G base station transceiver capability and a general-purpose processor running 2G base transceiver station (BTS) software.

4. The system of claim 1, the home security system further comprising a phone module in communication with the 2G femto base station.

5. The system of claim 1, further comprising a plurality of sensors for monitoring a status of at least one of locks, lights, and motion, the plurality of sensors in communication with the home security system.

6. The system of claim 1, the 2G femto base station further comprising long-range (LoRa) wireless.

7. The system of claim 1, the 2G femto base station further comprising an internal Universal Serial Bus (USB) connection with a third generation (3G) or 4G wireless modem for backhaul.

8. The system of claim 1, wherein the 2G base station is configured to authenticate the home security system using a Subscriber Identity Module (SIM) card of the home security system.

9. The system of claim 1, wherein the 2G femto base station is communicatively coupled to the home security system.

10. The system of claim 1, wherein the 2G femto base station is used for communications with a central system monitoring service.

11. The system of claim 1, wherein wireless access using the 2G femto base station is provided to other devices within the home.

* * * * *